US012339613B2

(12) United States Patent
Sekiya

(10) Patent No.: US 12,339,613 B2
(45) Date of Patent: Jun. 24, 2025

(54) IMAGE FORMING APPARATUS

(71) Applicant: CANON KABUSHIKI KAISHA, Tokyo (JP)

(72) Inventor: Takeshi Sekiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 18/539,053

(22) Filed: Dec. 13, 2023

(65) Prior Publication Data

US 2024/0201627 A1 Jun. 20, 2024

(30) Foreign Application Priority Data

Dec. 19, 2022 (JP) ................................ 2022-202100

(51) Int. Cl.
*G03G 15/08* (2006.01)
*G03G 21/16* (2006.01)
*G03G 15/00* (2006.01)

(52) U.S. Cl.
CPC ..... *G03G 21/1647* (2013.01); *G03G 15/0882* (2013.01); *G03G 15/5037* (2013.01); *G03G 2215/0687* (2013.01); *G03G 2221/1657* (2013.01)

(58) Field of Classification Search
CPC ........... G03G 15/0881; G03G 15/0882; G03G 15/0884; G03G 2215/0687; G03G 2215/0877; G03G 2215/088; G03G 2215/069
See application file for complete search history.

(56) References Cited

U.S. PATENT DOCUMENTS 6,516,168 B2 * 2/2003 Shiratori ............ G03G 21/1832 399/102
2016/0170353 A1 * 6/2016 Saito .................. G03G 15/0881 399/106

FOREIGN PATENT DOCUMENTS

JP 2002278240 A 9/2002

* cited by examiner

*Primary Examiner* — Thomas S Giampaolo, II
(74) *Attorney, Agent, or Firm* — Canon U.S.A., Inc. IP Division

(57) ABSTRACT

An image forming apparatus includes a developing device that is mountable and dismountable and has a sealing member for sealing to be removed at a time of start using the developing device. The image forming apparatus further includes a winding shaft, a drive source, a detector, and a controller. The winding shaft rotates for removal processing for removing the sealing member. The drive source drives the winding shaft. The detector detects a value corresponding to a load torque applied to the drive source. The controller notifies of an error in a case where the value detected by the detector has become smaller than a predetermined value before a predetermined period of time elapses from start of the drive by the drive source.

9 Claims, 5 Drawing Sheets

IMAGE FORMING APPARATUS

BACKGROUND

Field

The present disclosure relates to an image forming apparatus, such as a printer, a copying machine, a facsimile machine, and a multi-function machine.

Description of the Related Art

An electrographic image forming apparatus forms an electrostatic latent image on a photosensitive member serving as an image bearing member by a charging step and an exposure step. The image forming apparatus then develops the electrostatic latent image through use of a developer such as a toner by a development step to form a developer image on the photosensitive member. The developer image on the photosensitive member is formed on a recording medium by a transfer step and a fixing step. In some cases, such an image forming apparatus employs a cartridge system for its constituent part in order to allow replacement of a constituent part that has reached the end of its service life and replenishment of consumables, for example. For example, there is a conventional cartridge-type developing device (developing cartridge) in which a developer container which accommodates a developer and a developing roller which supplies the developer to a photosensitive member are integrated. There is also a process cartridge in which a developing device, a photosensitive member, a charging device which charges the photosensitive member, and a cleaner which cleans the photosensitive member are integrated.

In a developing cartridge, an opening of the developer container is sealed with a sealing member or the like in order to prevent leakage of the developer during transportation or replacement. In Japanese Patent Application Laid-open No. 2002-278240, there is disclosed an image forming apparatus having a removable developing cartridge that includes a developer sealing member for sealing an opening of a developer storage container.

In an image forming apparatus having the above noted conventional cartridge-type developing device, there is a sealing member that is automatically wound up after a developing cartridge is mounted to the image forming apparatus. In a case where the sealing member of the developing cartridge is slightly scratched or damaged, there is a possibility that the sealing member is damaged in the process of being wound up. In a case where the sealing member is damaged in the process of being wound up, the developer may not be sufficiently supplied to the developing roller, resulting in lower image quality. Through installation of a dedicated sensor, it is possible to detect whether the sealing member is damaged in the process of being wound up. However, such a sensor causes an increase in cost.

SUMMARY

The present disclosure provides an image forming apparatus capable of detecting damage of a sealing member.

According to an aspect of the present disclosure, an image forming apparatus having a developing device provided to the image forming apparatus in a mountable and dismountable manner, wherein the developing device includes a sealing member for sealing to be removed at a time of start using the developing device, the image forming apparatus includes a winding shaft configured to rotate for removal processing for removing the sealing member, a drive source configured to drive the winding shaft, a detector configured to detect a value corresponding to a load torque applied to the drive source, and a controller configured to notify of an error in a case where the value detected by the detector has become smaller than a predetermined value before a predetermined period of time elapses from start of the drive by the drive source.

Further features of the present disclosure will become apparent from the following description of exemplary embodiments (with reference to the attached drawings).

DESCRIPTION OF THE EMBODIMENTS

Now, referring to the accompanying drawings, a description is given of an exemplary embodiment of the present disclosure.

Figure 1:
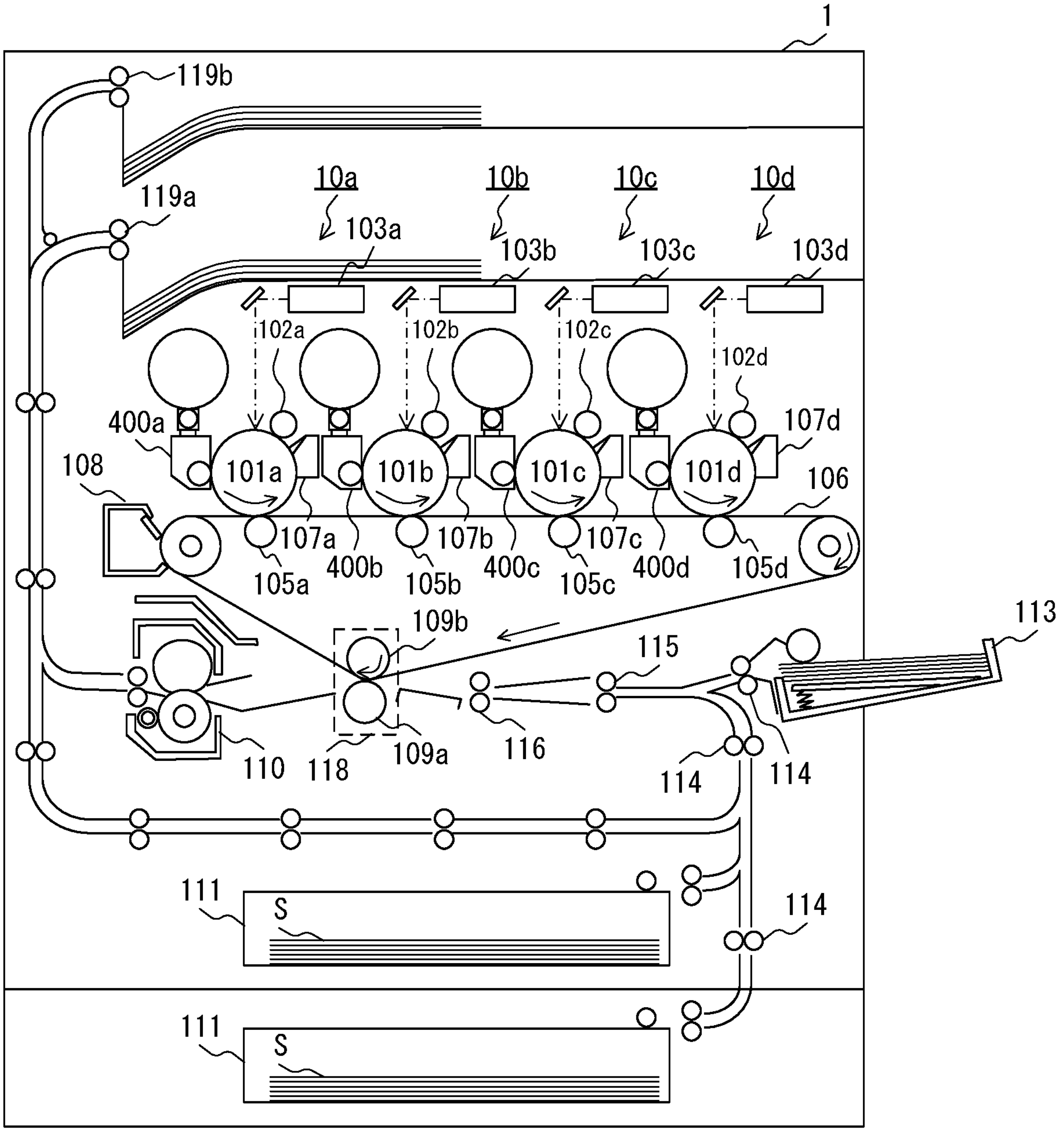
FIG. 1 is a diagram for illustrating a configuration of an image forming apparatus.

FIG. 1 is a diagram for illustrating a configuration of an image forming apparatus according to this embodiment. An image forming apparatus 1 is an electrophotographic color image forming apparatus in which four image forming units 10*a* to 10*d* which form developer images of respective colors of yellow, magenta, cyan, and black are arranged in parallel. The image forming units 10*a* to 10*d* differ from each other only in colors of the developer images to be formed, and have the same configuration.

The image forming units 10*a* to 10*d* include photosensitive drums 101*a* to 101*d*, charging rollers 102*a* to 102*d*, exposure devices 103*a* to 103*d*, developing devices 400*a* to 400*d*, primary transfer rollers 105*a* to 105*d*, and drum cleaners 107*a* to 107*d*, respectively. In the following description, in a case where it is not required to distinguish the colors, "a", "b", "c", and "d" at the ends of the reference symbols are omitted.

The photosensitive drum 101 is a drum-shaped photosensitive member including a photosensitive layer on its surface. The photosensitive drum 101 is rotatable about a drum shaft in a direction of the arrow. The charging roller 102 is a charging device, and uniformly charges the surface of the rotating photosensitive drum 101. The exposure device 103 exposes the charged surface of the photosensitive drum 101 with laser light subjected to light emission control based on image signals of respective colors. As a result of the exposure with the laser light, an electrostatic latent image corresponding to a corresponding one of the colors is formed on the surface of the photosensitive drum 101.

The developing device 400 accommodates therein a developer of a corresponding color, and causes the developer to adhere to the electrostatic latent image to form a developer image corresponding to the corresponding one of the colors on the surface of the photosensitive drum 101. In this embodiment, the developer includes a toner, and a toner image corresponding to the corresponding one of the colors is formed on the surface of the photosensitive drum 101. The developing device 400 is a cartridge-type developing device that is mountable to and dismountable from the image forming apparatus 1 so that the developing device 400 can be easily replaced.

With the configuration described above, a yellow toner image is formed on the surface of the photosensitive drum 101*a*. A magenta toner image is formed on the surface of the photosensitive drum 101*b*. A cyan toner image is formed on the surface of the photosensitive drum 101*c*. A black toner image is formed on the surface of the photosensitive drum 101*d*.

The primary transfer roller 105 is arranged to be opposed to the photosensitive drum 101 with an intermediate transfer belt 106 being interposed between the primary transfer roller 105 and the photosensitive drum 101. The intermediate transfer belt 106 is an image bearing member having a shape of an endless belt, and is rotatable clockwise in FIG. 1. With application of a predetermined bias voltage (transfer bias) to the primary transfer roller 105 at a timing associated with rotation of the intermediate transfer belt 106, the primary transfer roller 105 transfers the toner image from the photosensitive drum 101 onto the intermediate transfer belt 106. At this time, the toner images of the respective colors are transferred from the respective photosensitive drums 101*a* to 101*d* onto the same position of the intermediate transfer belt 106. As a result, the toner images of the respective colors are superimposed and borne on the intermediate transfer belt 106. The toner that remains on the photosensitive drum 101 after the transfer is collected by the drum cleaner 107.

The intermediate transfer belt 106 is wound around a plurality of rollers including a secondary transfer roller 109*b*. A secondary transfer roller 109*a* is arranged at a position opposed to the secondary transfer roller 109*b* across the intermediate transfer belt 106. The secondary transfer roller 109*a* and the secondary transfer roller 109*b* form a secondary transfer portion 118. The intermediate transfer belt 106 rotates to convey the toner images of the respective colors borne thereon to the secondary transfer portion 118. A belt cleaner 108 is arranged on a downstream side of the secondary transfer portion 118 in a direction in which the intermediate transfer belt 106 conveys the toner images.

A recording material S, which is a sheet-shaped recording medium on which an image is to be printed, is fed from any one of a sheet feeding cassette 111 and a manual feed portion 113. The recording material S is fed at a timing associated with start of an image forming operation performed by the image forming unit 10. On a conveyance path in which the recording material S is to be conveyed, a plurality of pairs of conveyance rollers 114, conveyance rollers 115, and registration rollers 116 are arranged. The fed recording material S is conveyed to the conveyance rollers 115 by the plurality of pairs of conveyance rollers 114. The conveyance rollers 115 convey the recording material S conveyed thereto to the registration rollers 116. The registration rollers 116 correct skew feeding of the recording material S and temporarily stop the conveyance. The registration rollers 116 convey the recording material S to the secondary transfer portion 118 in synchronization with a timing at which the toner images borne on the intermediate transfer belt 106 are conveyed to the secondary transfer portion 118.

The secondary transfer portion 118 nips and conveys the intermediate transfer belt 106 and the recording material S between the secondary transfer roller 109*a* and the secondary transfer roller 109*b*. At this time, with application of a predetermined bias voltage (transfer bias) to the secondary transfer roller 109*a*, the toner images of the four colors are collectively transferred from the intermediate transfer belt 106 onto the recording material S. The conveyance timing is adjusted by the registration rollers 116, and hence the toner images are transferred onto a predetermined position of the recording material S. The toner that remains on the intermediate transfer belt 106 after the transfer is collected by the belt cleaner 108.

The secondary transfer portion 118 conveys the recording material S onto which the toner images have been transferred to a fixing device 110 arranged on a downstream side of the secondary transfer portion 118 in a direction in which the recording material S is to be conveyed. The fixing device 110 applies heat and pressure to the recording material S onto which the toner images have been transferred, to thereby melt and mix toners of the respective colors and fix the toners to the recording material S by pressure. As a result, a full-color image is fixed to the recording material S. The recording material S to which the image has been fixed is delivered to the outside of the image forming apparatus 1 as a printed matter by a delivery portion 119*a* or 119*b* arranged on a downstream side of the fixing device 110 in the direction in which the recording material S is to be conveyed.

In this embodiment, the developing devices 400*a* to 400*d* are described as being cartridge-type developing devices, but other constituent parts may also be configured as cartridge-type parts so that the parts can be replaced. For example, constituent parts of each image forming unit 10 other than the exposure device 103 and the primary transfer roller 105, and the intermediate transfer belt 106 may be cartridge-type parts.

Figure 2:
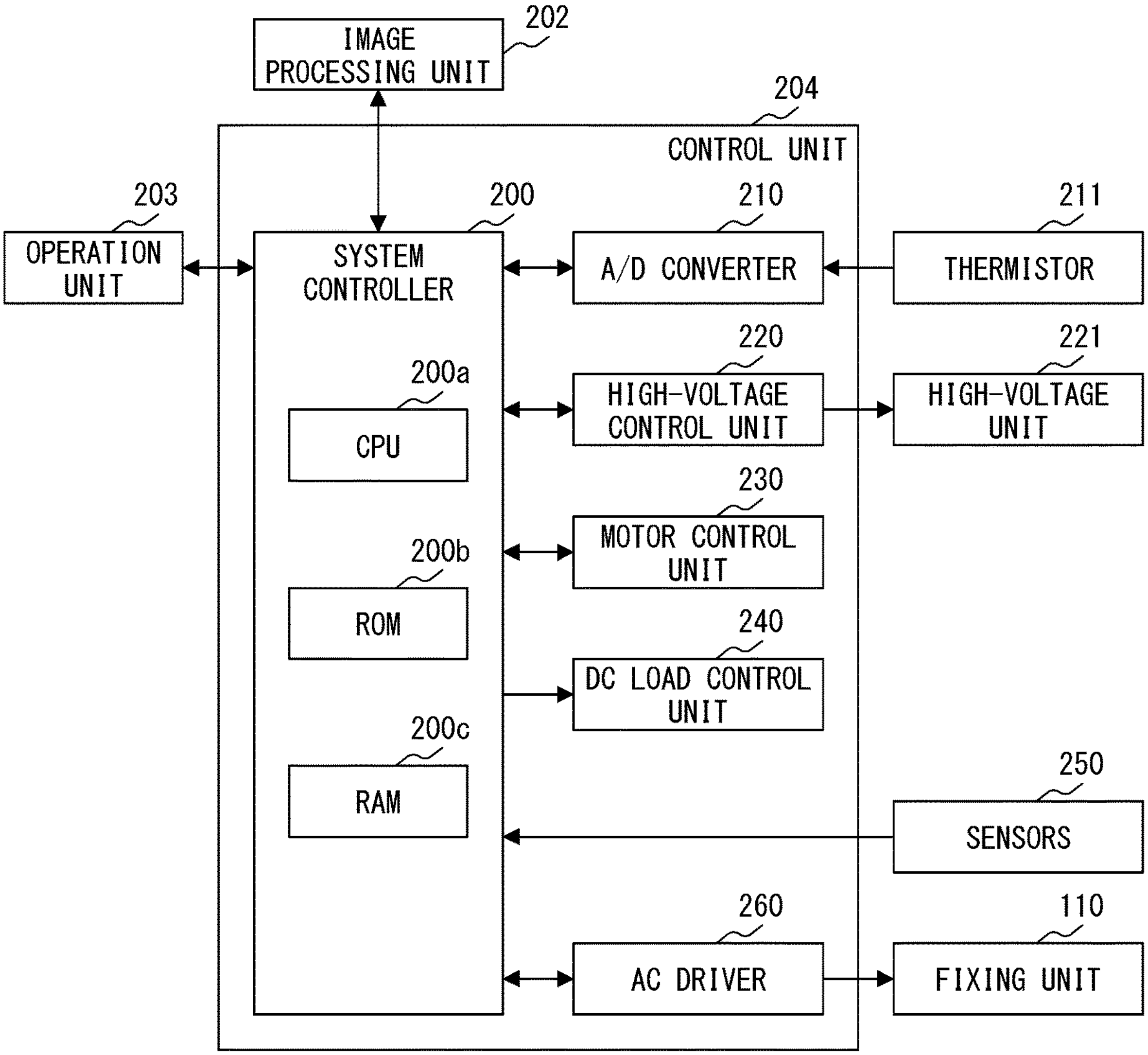
FIG. 2 is a diagram for illustrating a configuration of a control unit.

FIG. 2 is a diagram for illustrating a configuration of a control unit which centrally controls an operation of the image forming apparatus 1 configured as described above. A control unit 204 performs drive control of each load provided in the image forming apparatus 1, collects detection results obtained by sensors, analyzes the detection results, and performs other such processing. The control unit 204 in this embodiment is connected to an image processing unit 202, an operation unit 203, a thermistor 211, a high-voltage unit 221, sensors 250, and the fixing device 110.

The image processing unit 202 performs various types of image processing on an image signal under the control of the control unit 204 in order to achieve formation of an image having optimum image quality. The operation unit 203 is a user interface including an input interface and an output interface. Examples of the input interface include various types of key buttons and a touch panel. Examples of the output interface include a display and a speaker.

The thermistor 211 is used to detect a temperature of the fixing device 110. The high-voltage unit 221 outputs, under the control of the control unit 204, a high voltage to be applied to, for example, each of the primary transfer rollers 105*a* to 105*d*, the secondary transfer roller 109*a*, the charging rollers 102*a* to 102*d*, and a developing sleeve included in the developing device 400, which is described later. The sensors 250 are arranged at respective portions inside the image forming apparatus 1, and are used to detect an operation state and the like of the image forming apparatus 1.

The control unit 204 includes a system controller 200, an A/D converter 210, a high-voltage control unit 220, a motor control unit 230, a DC load control unit 240, and an AC driver 260. The system controller 200 includes a central processing unit (CPU) 200*a*, a read-only memory (ROM)

200*b*, and a random access memory (RAM) 200*c*. The CPU 200*a* controls an operation of the image forming apparatus 1 by executing a computer program stored in the ROM 200*b*. The RAM 200*c* provides a work area to be used in a case where the CPU 200*a* executes processing to save temporary data, for example. In the ROM 200*b*, in addition to the computer program, various setting values required for control of the image forming apparatus 1 and a threshold value for determination are stored in advance.

The system controller 200 instructs the image processing unit 202 to perform various types of setting (for example, copying magnification, image density setting, and the number of sheets to be printed) and processing for image processing. The system controller 200 receives an instruction and setting given by a user which are input from the operation unit 203. The system controller 200 transmits, to the operation unit 203, data for notifying the user of a state of the image forming apparatus 1, for example, information on the number of sheets to be printed, information indicating whether an image is being formed, occurrence of a jam, and a location of the jam. Further, communication for performing various types of setting for a tabbed sheet and warning display for the tabbed sheet is performed between the system controller 200 and the operation unit 203. The system controller 200 in this embodiment further transmits data for notifying of damage of a sealing member described later to the operation unit 203.

The system controller 200 acquires a detection signal of the temperature which is output from the thermistor 211 via the A/D converter 210. The detection signal output from the thermistor 211 is an analog signal. The A/D converter 210 converts the analog detection signal acquired from the thermistor 211 into a digital signal that can be processed by the CPU 200*a*, and transmits the detection signal obtained by the conversion to the system controller 200. The system controller 200 detects the temperature of the fixing device 110 based on the digital detection signal.

The system controller 200 controls the temperature of the fixing device 110 via the AC driver 260. The system controller 200 transmits to the AC driver 260, based on the temperature of the fixing device 110 detected through use of the thermistor 211, an instruction for keeping the fixing device 110 at a predetermined temperature. In a case where the AC driver 260 acquires the instruction, the AC driver 260 controls a current to be supplied to the fixing device 110, to thereby control the temperature of the fixing device 110.

The system controller 200 controls an operation of the high-voltage unit 221 via the high-voltage control unit 220. The system controller 200 transmits an instruction to apply a voltage to the high-voltage control unit 220 at a timing at which a high voltage is required to be applied. In a case where the high-voltage control unit 220 acquires the instruction to apply a voltage, the high-voltage control unit 220 controls the high-voltage unit 221 to output a high voltage. The system controller 200 acquires results of detection from the respective sensors 250. The system controller 200 detects states of the image forming apparatus 1 based on the results of detection obtained by the respective sensors 250 to, for example, control an operation of the image forming apparatus 1 and notify of an error through the operation unit 203.

The system controller 200 controls an operation of a drive source such as a motor arranged in the image forming apparatus 1 via the motor control unit 230. To this end, the system controller 200 transmits, to the motor control unit 230, a control signal for controlling the drive source. The motor control unit 230 performs drive control of the drive source based on the control signal. As a result, a driving force is supplied from the drive source to a load, and the load thus operates.

The system controller 200 controls an operation of a DC load arranged in the image forming apparatus 1 via the DC load control unit 240. To this end, the system controller 200 transmits, to the DC load control unit 240, a control signal for controlling the DC load. The DC load control unit 240 controls the operation of the DC load based on the control signal.

Configuration of Developing Device

Figure 3A:
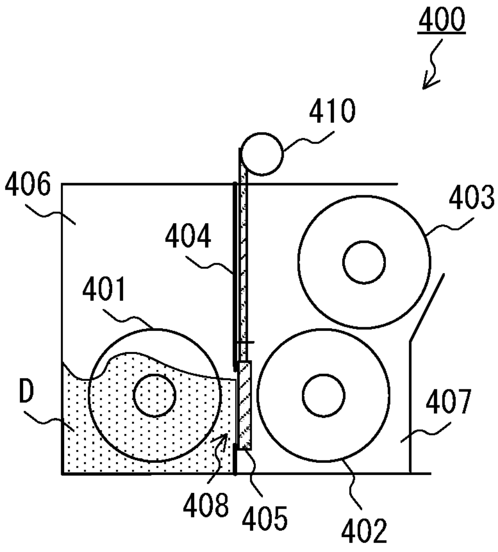
FIG. 3A and FIG. 3B are explanatory views for illustrating a configuration of a developing device.
Figure 3B:
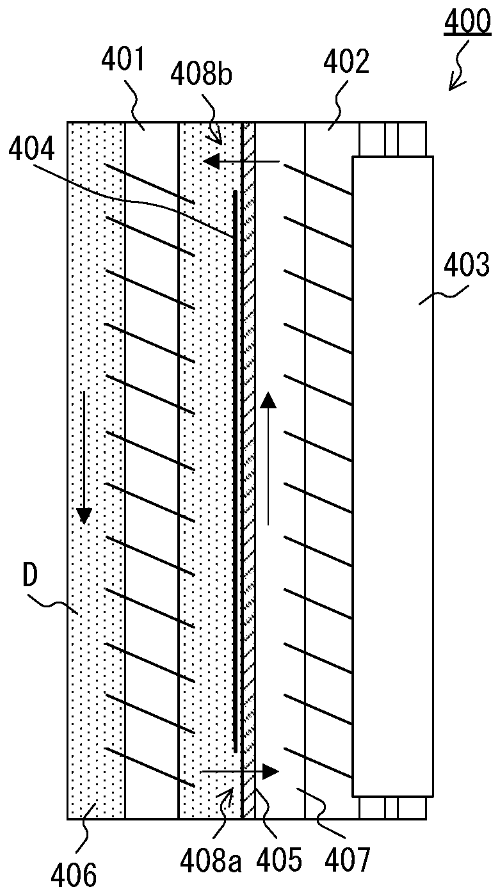

FIG. 3A and FIG. 3B are explanatory views for illustrating a configuration of the developing device 400. FIG. 3A is a side view of the developing device 400 (as viewed from a front side of FIG. 1), and FIG. 3B is a top view of the developing device 400 (as viewed from a top side of FIG. 1).

As described above, the developing device 400 is a cartridge-type constituent part that is mountable to and dismountable from the image forming apparatus 1 and that can be easily replaced. The developing device 400 includes a first conveyance screw 401, a second conveyance screw 402, a developing sleeve 403, a first accommodating chamber 406, a second accommodating chamber 407, a partition wall 404, and communication ports 408. The developing device 400 also includes, under an initial state before being used, a sealing member 405 to be removed in a case where the developing device 400 is mounted to the image forming apparatus 1.

The first accommodating chamber 406 and the second accommodating chamber 407 are partitioned by the partition wall 404. In the partition wall 404, the communication ports 408 (408*a* and 408*b*) which allow the first accommodating chamber 406 and the second accommodating chamber 407 to communicate with each other are formed. In this embodiment, the communication ports 408 are formed at two positions corresponding to both ends of the partition wall 404 (communication ports 408*a* and 408*b*). Under the initial state of the developing device 400, the communication ports 408 are sealed by the sealing member 405. Accordingly, under the initial state, a developer D is accommodated only in the first accommodating chamber 406, and the developer D is not accommodated in the second accommodating chamber 407. The developer D in this embodiment is a two-component developer containing a non-magnetic toner and a magnetic carrier.

The sealing member 405 is connected to a winding shaft 410. In a case where the developing device 400 is mounted to the image forming apparatus and the winding shaft 410 is then driven, the sealing member 405 is wound up by the winding shaft 410. As a result, the communication ports 408 are opened. In a case where the communication ports 408 are opened, the first accommodating chamber 406 and the second accommodating chamber 407 communicate with each other, and the developer D accommodated inside the first accommodating chamber 406 flows into the second accommodating chamber 407 via the communication ports 408.

The first conveyance screw 401 is mounted inside the first accommodating chamber 406 in a rotatable manner. The first conveyance screw 401 rotates to convey the developer D accommodated inside the first accommodating chamber 406 toward a direction of the communication port 408*a* being one of the communication ports while stirring the developer D. The second conveyance screw 402 is mounted inside the second accommodating chamber 407 in a rotatable manner.

The second conveyance screw 402 rotates to convey the developer D accommodated inside the second accommodating chamber 407 toward a direction of the communication port 408*b* being the other one of the communication ports while stirring the developer D.

With the first conveyance screw 401 and the second conveyance screw 402, the developer D is conveyed while being stirred in a circulation path (path indicated by the arrows in FIG. 3B) formed by the first accommodating chamber 406, the communication port 408*a*, the second accommodating chamber 407, and the communication port 408*b*. With the developer D being stirred in the process of conveyance, the toner and the carrier are charged to opposite polarities as a result of friction caused between toner particles and carrier particles. In this embodiment, the toner is charged to a negative polarity, and the carrier is charged to a positive polarity.

The developing sleeve 403 is arranged in the second accommodating chamber 407 so as to be opposed to the photosensitive drum 101 (not shown). In the developing sleeve 403, a magnet is provided. On a surface of the magnet, a plurality of magnetic poles are arranged, and the magnet is supported inside the developing sleeve 403 in a non-rotatable manner. With the carrier (magnetic body) being bound by a magnetic flux formed between the magnetic poles of the magnet, the developer D is borne on the surface of the developing sleeve 403. With the toner charged to the negative polarity being electrostatically bound on the surface of the carrier charged to the positive polarity, a magnetic brush is formed on the surface of the developing sleeve 403. With an amplitude voltage obtained by superimposing an AC voltage onto a DC voltage having a negative polarity being applied from the high-voltage unit 221 to the developing sleeve 403, the toner borne on the magnetic brush moves onto the electrostatic latent image on the photosensitive drum 101 to adhere to the electrostatic latent image. As a result, the electrostatic latent image is developed.

Drive Control of Winding Shaft 410

Figure 4:
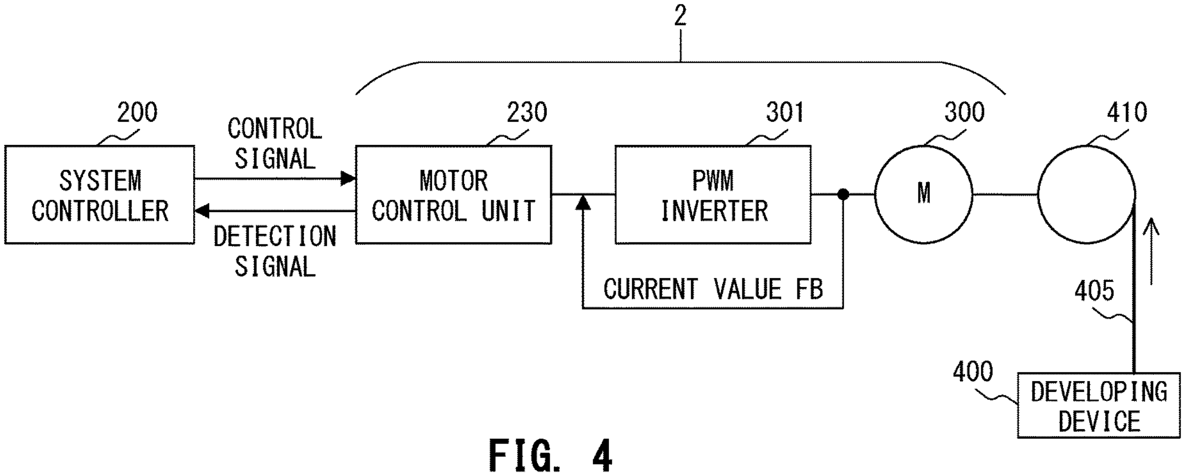
FIG. 4 is an explanatory diagram for illustrating a configuration of a motor drive control unit.

FIG. 4 is an explanatory diagram for illustrating a configuration of a motor drive control unit which performs drive control of the winding shaft 410 in order to wind up the sealing member 405 onto the winding shaft 410. The winding shaft 410 is connected to a stepping motor 300 serving as the drive source via a mechanism (not shown) for transmitting the driving force, which is formed of a gear and the like. The winding shaft 410 is driven to rotate by the driving force supplied from the stepping motor 300 to wind up the sealing member 405. As a result, the sealing member 405 is removed from the communication ports 408.

The motor drive control unit 2 includes the motor control unit 230, a pulse width modulation (PWM) inverter 301, and the stepping motor 300. The system controller 200 transmits a control signal including a position command value specifying a position of the stepping motor 300 to the motor control unit 230. The motor control unit 230 generates such a PWM signal as to reduce a difference between the position specified by the position command value included in the control signal acquired from the system controller 200 and an actual position of the stepping motor 300, and transmits the PWM signal to the PWM inverter 301.

The PWM inverter 301 causes a full-bridge circuit (not shown) to operate based on the PWM signal acquired from the motor control unit 230 to cause a predetermined current to flow through a winding of the stepping motor 300. With the configuration and the operation described above, the stepping motor 300 is driven and the winding shaft 410 rotates, and a winding process for winding the sealing member 405 is thus performed.

The motor control unit 230 detects a motor current value (current value FB) of a motor current flowing through the stepping motor 300, and transmits the detected motor current value to the system controller 200 as a detection signal. The motor current value is a current value that is proportional to a load torque applied to the stepping motor 300. Accordingly, the system controller 200 can monitor the magnitude of the load torque of the stepping motor 300 by monitoring the motor current value (detection signal). The motor current value becomes lower than a predetermined current value in a case where the load torque of the stepping motor 300 decreases in a case in which the sealing member 405 has been damaged. For this reason, the system controller 200 can detect that the sealing member 405 has been damaged by monitoring the motor current value.

Figure 5:
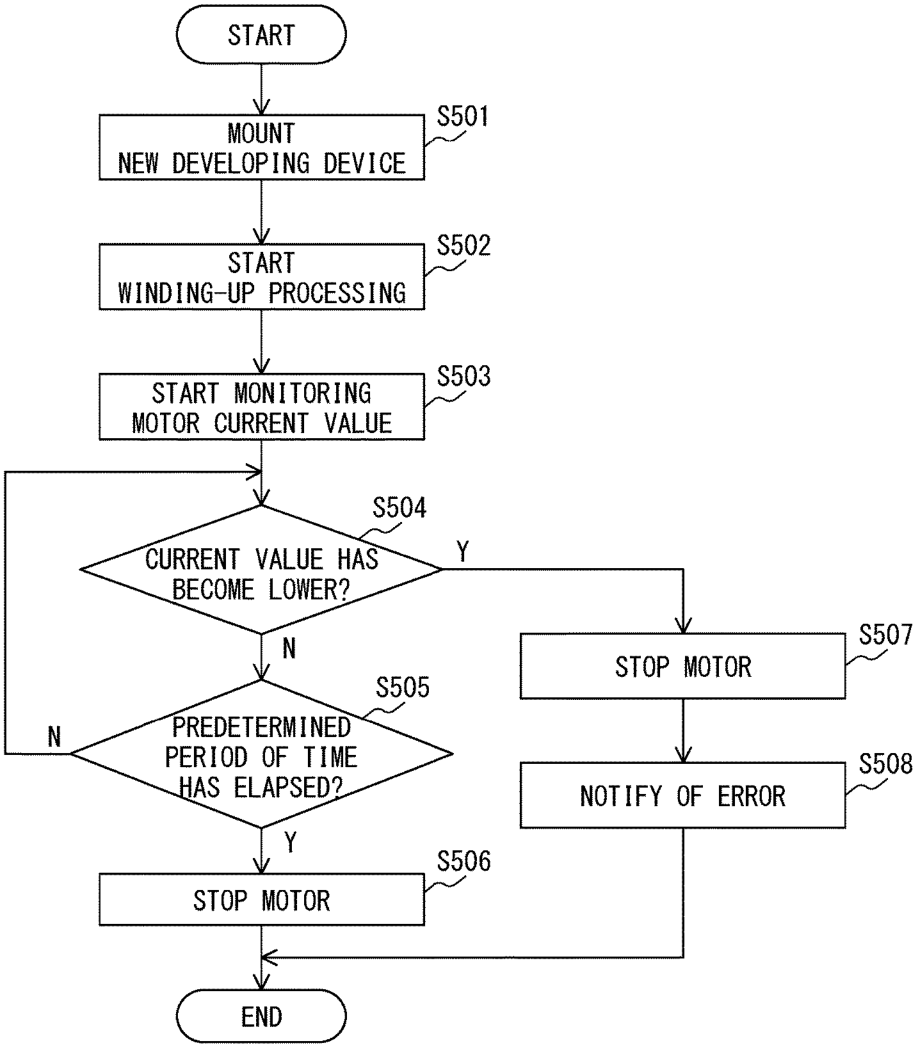
FIG. 5 is a flowchart for illustrating winding process for winding a sealing member.

The winding process is executed in a case where the system controller 200 detects that the cartridge-type developing device 400 has been mounted to the image forming apparatus 1. The winding process is also executed in a case where the user inputs an instruction to wind up the sealing member 405 through the operation unit 203. FIG. 5 is a flowchart for illustrating the winding process.

In a case where the system controller 200 detects that a new developing device 400 has been mounted to the image forming apparatus 1, the system controller 200 starts the winding process for the developing device 400 that has been newly mounted (Step S501 and Step S502). The developing device 400 includes a memory (not shown), for example. In the memory, information indicating characteristics of the developing device 400 (such as an individual identification number and information indicating that this developing device 400 is new (unused)) is saved. In a case where the developing device 400 has been mounted, the system controller 200 can determine whether the developing device 400 is a new developing device 400 that has been newly mounted by reading the information saved in the memory. In a case where the developing device that has been mounted is not a new developing device, the winding process is not executed.

The system controller 200 performs the winding process by driving the winding shaft 410 to rotate by the motor drive control unit 2 (Step S502). The system controller 200 starts monitoring the motor current value (Step S503). The system controller 200 examines whether the load torque of the stepping motor 300 falls within a normal range by monitoring the motor current value.

In a case where the motor current value does not become lower than the predetermined current value (Step S504: N), this means that, as long as the load torque of the stepping motor 300 falls within the normal range, the winding process is being normally performed. In this case, the system controller 200 determines whether a predetermined period of time or more has elapsed since the start of the winding process (Step S505). The predetermined period of time is a period of time required until the winding process is completed. In a case where the predetermined period of time has not elapsed (Step S505: N), the system controller 200 continuously performs the winding process while continuing monitoring the motor current value.

In a case where the predetermined period of time or more has elapsed (Step S505: Y), this means that the winding process has been normally completed. Thus, the system controller 200 stops the rotation of the stepping motor 300 to finish the winding process (Step S506). In a case where the winding process has been normally finished, the system controller 200 rewrites the information indicating that the relevant developing device 400 is new, which is stored in the memory of the developing device 400, into information indicating that the developing device 400 is not new.

In a case where the motor current value has become lower than the predetermined current value before the predetermined period of time elapses (Step S504: Y), it is highly likely that the load torque of the stepping motor 300 has deviated from the normal range as a result of the sealing member 405 being damaged during the winding process. Thus, even when the predetermined period of time has not elapsed, the system controller 200 stops the rotation of the stepping motor 300 to discontinue the winding process (Step S507). The system controller 200 outputs, through the operation unit 203, an error notification indicating that the winding process is discontinued because the sealing member 405 has been damaged (Step S508). The user can be notified that the sealing member 405 has been damaged through the error notification.

Figure 6A:
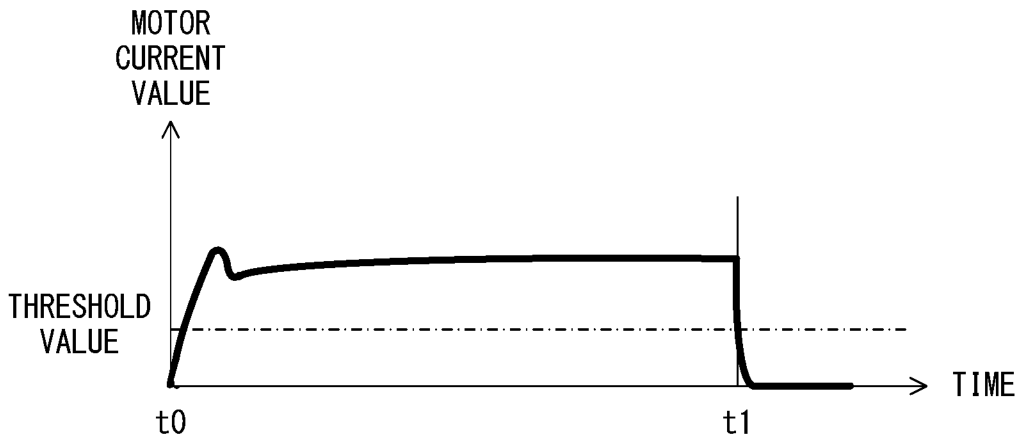
FIG. 6A and FIG. 6B are graphs for showing transitions of a motor current value at the time of the winding process.
Figure 6B:
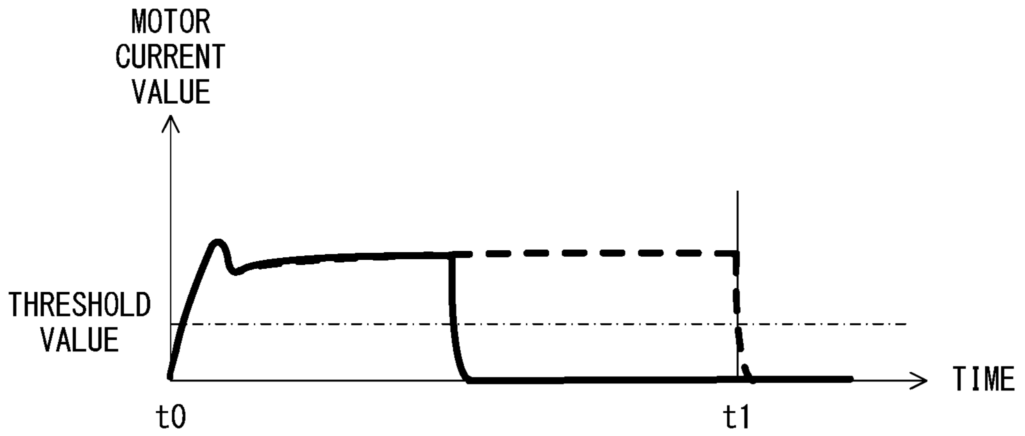

FIG. 6A and FIG. 6B are graphs for showing transitions of the motor current value at the time of the winding process. FIG. 6A shows a transition of the motor current value at the time when the winding process is normally completed, and FIG. 6B shows a transition of the motor current value at the time when the winding process is not normally completed because the sealing member 405 has been damaged.

In FIG. 6A, a normal operation is being performed, and hence a predetermined load torque is generated on the stepping motor 300 until the winding process is completed. Accordingly, from a time when the drive of the stepping motor 300 is started until a timing t1 at which the winding process is completed, which arrives a predetermined period of time after the time of the start, a motor current having a current value larger than the threshold value, which is the predetermined current value used in the processing step of Step S504, is detected. In a case where the winding process is normally completed, the current value becomes smaller than the threshold value at the timing t1. The threshold value is stored in advance in the ROM 200*b* of the system controller 200. A motor current value corresponding to a lower limit value of the load torque generated at the time of the winding process is set as the threshold value. The system controller 200 compares the motor current value generated during the winding process to the threshold value, and determines that the load torque has become lower than a predetermined torque value in a case where the motor current value has become smaller than the threshold value.

In FIG. 6B, the sealing member 405 is damaged in the process of the winding process, and hence the load torque of the stepping motor 300 suddenly decreases in the process of the winding process (before the timing t1 is reached). Consequently, the motor current value decreases to be smaller than the threshold value. As a result, the system controller 200 can determine that the sealing member 405 has been damaged to stop the stepping motor 300.

As described above, the image forming apparatus 1 according to this embodiment monitors the load torque applied to the drive source (stepping motor 300) which drives the winding shaft 410 during the winding process which uses the winding shaft 410. In the above description, the load torque of the drive source is monitored by monitoring the motor current value, but a signal output from the drive source other than the motor current value may also be used as long as the load torque can be monitored.

In a case where the load torque has become smaller than the predetermined torque value before the winding process is finished, that is, in a case where the motor current value has become smaller than the threshold value, it is determined that the sealing member 405 has been damaged. In this case, the system controller 200 stops the drive of the drive source (stepping motor 300), and can notify the user that the sealing member 405 has been damaged in the process of being wound up, to urge the user to take an action against this event. Examples of the action to be taken include replacing the relevant developing device by another developing device and manually removing the sealing member 405. As described above, with the image forming apparatus 1 according to this embodiment, it is possible to detect that the sealing member 405 has been damaged in the process of winding the sealing member 405 without adding a new part such as a sensor, that is, without increasing cost.

In the above description, the stepping motor 300 is used as a motor serving as the drive source, but another type of motor can be used as the drive source. For example, a brushless motor can also be used as the drive source. Any type of drive source can be used as long as the drive source can detect a change in load torque. For example, in a motor to be subjected to drive control based on position control and speed control, a drive current changes in a case where the load torque changes. Accordingly, by setting a threshold value for a current value of the drive current and monitoring whether an actual drive current is equal to or higher than the threshold value, it is possible to determine whether the sealing member 405 has been damaged.

In the above description, the winding process for winding the seal member 405 of the cartridge-type developing device 400 that is mountable and dismountable is taken as an example, but similar processing can also be performed on a constituent part other than the developing device 400. That is, the motor drive control unit 2 configured as described above is effective for a cartridge-type constituent part that is mountable to and dismountable from the image forming apparatus 1 and from which the sealing member 405 is required to be removed in a case where this constituent part starts to be used.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-202100, filed Dec. 19, 2022, which is hereby incorporated by reference herein in its entirety.

What is claimed is:

1. An image forming apparatus having a developing device provided to the image forming apparatus in a mountable and dismountable manner, wherein the developing device includes a sealing member for sealing to be removed at a time of starting use of the developing device, the image forming apparatus comprising:

a winding shaft configured to rotate for removal processing for removing the sealing member;

a drive source configured to drive the winding shaft; a detector configured to detect a value corresponding to a load torque applied to the drive source; and a controller configured to notify of an error in a case where the value detected by the detector has become smaller than a predetermined value before a predetermined period of time elapses from start of the drive by the drive source.

2. The image forming apparatus according to claim 1, wherein the controller is configured to provide, as the error, a notification indicating that the sealing member has been damaged.

3. The image forming apparatus according to claim 1, wherein the predetermined period of time is a period of time corresponding to a period of time required to remove the sealing member.

4. The image forming apparatus according to claim 1, wherein the detector is configured to detect a current value of a current flowing through the drive source as the value corresponding to the load torque.

5. The image forming apparatus according to claim 1, wherein the controller is configured to stop the drive source in a case where the value detected by the detector has become smaller than the predetermined value before the predetermined period of time elapses from the start of the drive by the drive source.

6. The image forming apparatus according to claim 1, wherein the developing device includes:

a first accommodating chamber configured to accommodate a developer, a second accommodating chamber, a partition wall configured to partition the first accommodating chamber and the second accommodating chamber, and a communication port formed in the partition wall and configured to allow the first accommodating chamber and the second accommodating chamber to communicate with each other, and wherein the sealing member is configured to seal the communication port under a state before starting to use the developing device.

7. The image forming apparatus according to claim 6, wherein the first accommodating chamber includes a first conveyance screw configured to convey the developer toward a direction of the communication port, and wherein the second accommodating chamber includes a second conveyance screw configured to convey the developer that flows into the second accommodating chamber via the communication port that has been opened by winding of the sealing member.

8. The image forming apparatus according to claim 7, wherein the communication port includes communication ports formed at two positions corresponding to both ends of the partition wall, wherein the first conveyance screw is configured to convey the developer to one of the communication ports, and wherein the second conveyance screw is configured to convey the developer to another one of the communication ports.

9. The image forming apparatus according to claim 1, wherein the developing device includes a memory configured to store information indicating whether the developing device is unused, and wherein the controller is configured to control the drive source so that the drive source executes the removal processing in a case where information indicating that the developing device is unused is stored in the memory of the developing device that has been mounted.

* * * * *